Figure 1:
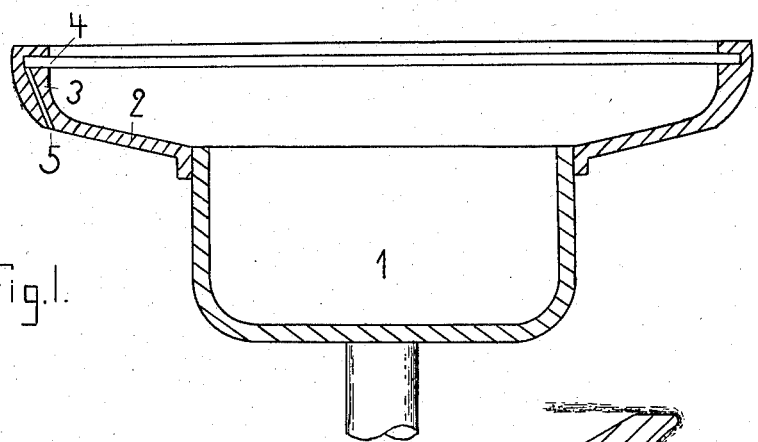

Feb. 11, 1930.  P. A. NEUMANN  1,746,789

CENTRIFUGAL MERCURY TRAP

Filed Jan. 6, 1928

Inventor:
Paul A. Neumann

Patented Feb. 11, 1930

1,746,789

UNITED STATES PATENT OFFICE

PAUL A. NEUMANN, OF CHICAGO, ILLINOIS

CENTRIFUGAL MERCURY TRAP

Application filed January 6, 1928. Serial No. 244,888.

The invention relates to centrifugal mercury traps as an accessory part to centrifugal amalgamators or separators, using liquid mercury or amalgam plates, and the trap may be used either fixed to these devices or as a separate machine treating the material coming from them; and the object of the improvement is to provide simple and effective means to catch the mercury, sometimes carrying valuable metal in solution, which accidentally or otherwise leaves the above mentioned machines together with the tailings. Another object of the improvement is to allow a lighter construction of the trap, the invention avoiding the great pressure against the walls of the trap by the material filling it.

The word trap is generally used for grooves or pockets of various shapes filled not only with mercury alone but also with mercury together with sand and slimes. Such grooves or pockets are not used in my invention. In this specification I designate by the word trap the whole machine or the part of the machine devised to catch liquid mercury from tailings.

In the drawings I do not show those parts of the machine which have nothing to do with the matter of my invention, such as pulleys, launders, inlet pipe for the material and also the customary means for rotating the material such as blades or vanes and the like.

Figures 2, 4:
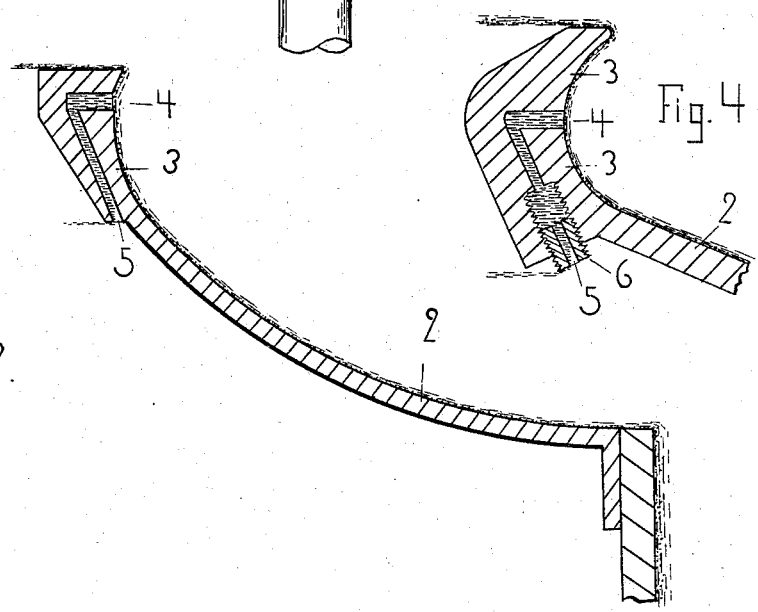
Figure 3:
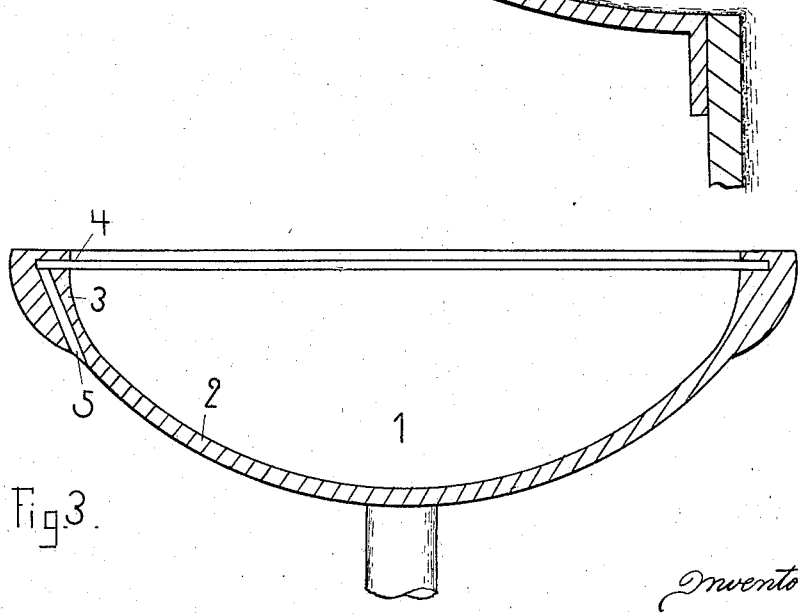

In the accompanying drawing Fig. 1 is a vertical section through a centrifugal amalgamator or separator with the centrifugal mercury trap mounted thereon. The same figure may also illustrate the invention working as a separate machine. Fig. 2 is a section through a part of the trap of a different form. Fig. 3 is a section through another form of the trap designed to work as a separate machine. Fig. 4 is a section through a part of the trap of another form also showing a special accessory device to it.

In Fig. 1 a rotating vessel 1 is shown. 2 is a circular member connecting the vessel 1 with a rim 3. The rim 3 is provided with a circular groove 4. The groove 4 is connected with the outside of the trap by one or more holes 5. In Fig. 4 number 6 is a perforated screw fitting into the threaded hole 5.

In Figs. 2, 3, and 4 the same parts are designated by the same numbers as in Fig. 1, but in Fig. 3 the connecting member 2 is formed by the walls of the vessel.

The circular connecting member 2 is preferably inclined upward towards the rim 3 into which it merges in a curve. The reasons for this will be given later in describing the working of the device. The inside of the rim 3 at the mouth of the groove 4 is practically cylindrical; beyond the groove 4 it is bent slightly inwards. The hole or holes 5 lead from the groove 4 in a direction toward the center, and their orifices are situated at about the same distance from the center of rotation as the mouth of the groove 4.

Before starting the working of the machine either as a separate machine working behind some other machine as shown in Figs. 1 and 3, or as an accessory part fixed to an amalgamator or separator, as shown in Figs. 1 and 2, sufficient mercury is charged to fill the groove 4 and the hole or holes 5.

When the pulp flows over the inside of the rim 3 it will cause a very slight overpressure on the mercury in the groove 4, and any further mercury flowing into the groove 4 will cause the same amount to be thrown out from the orifices of the holes 5, where it can be caught in a separate launder in the usual way.

The supposition is that, in using the invention as a separate machine, as shown in Figs. 1 and 3, a pulp is charged into the vessel 1, carrying tailings and some mercury, but that the precious metals have been separated from the pulp before in a separate machine. In using the invention as an accessory part, as shown in Figs. 2, 4 and also in Fig. 1, any means to amalgamate or to separate the precious metals have been employed in the same vessel 1, and here also the pulp flowing over from the walls of the vessel 1 onto the connecting member 2 is free from precious metals but carries some mercury.

Flowing over the connecting member 2 the pulp is spread out into a very thin film. The object of having this connecting member 2 somewhat upwardly inclined towards the rim 3 is to press the pulp against this incline in order to better impart the rotation to the pulp, and to keep the heaviest substance, the mercury, next to the connecting member 2. The pulp will flow outwards at an increased speed, owing to the increase in centrifugal force by the increase in radius, and the pulpstream will lose in depth thereby and by its covering a larger surface. In the form of a very thin film the pulp travels over the curve leading into the rim 3, and over the inner practically cylindrical surface of the rim 3 where it is provided with the groove 4. The pulp is then discharged into a launder in the usual way. In passing the mouth of the groove 4 any mercury contained in the pulp is forced into the groove. No solids however will be able to settle on the comparatively short inner surface of the rim 3 owing to the speed of the thin film.

The mercury in the groove 4 may not come quite up to the mouth of the groove if the orifice of the hole or holes 5 be situated at the same distance from the center of rotation as the mouth of the groove 4. This is due to a slight pressure on the mercury in the groove by the pulpstream flowing over it. This pulpstream being in the form of a thin film this pressure will have little or no practical influence. By moving the orifices of the holes 5 more centerwards the mercury in the groove 4 can be raised. In Fig. 4 I illustrate how this can be done without an alteration to the trap. If the perforated screw 6 is screwed farther out of the rim 3, then the orifice of the hole 5 will be moved more towards the center of rotation, and consequently the mercury in the groove 4 will rise. Screwing the screw 6 farther in will cause the mercury in the groove to fall.

In most cases it will be desirable to form the inside end of the rim 3 beyond the groove 4 slightly bent inwards, in order not to lose mercury with the tailings. This will also prevent mercury from being lost by the vibrations of the rotating vessel. But the surface of the mercury ought not to come more inwards than the mouth of the groove; and the inwardly bent of the rim 3 beyond the groove ought not to be such as to cause any deposits from the pulp to settle on the rim.

I am aware that mercury traps are known using holes for the discharge of the surplus mercury in the same way as I use them. These traps however are so constructed that either the sands and slimes settling in them causes the mercury to flow over them to waste, or that the impact of the pulpstream throws mercury from the trap. I avoid both these drawbacks by the forming of a thin quickly flowing pulpfilm over the inner surface of a rim provided with a groove kept practically full with mercury. In this way I obtain a greater efficiency and I can use a lighter construction than in other traps.

I claim:

1. In a centrifugal mercury trap, a rotating receptacle having an upper part provided with an outwardly and upwardly curved inner wall terminating in a rim adapted to permit flow and discharge of tailings in a thin film, there being a groove in the rim extending outwardly from its inner wall, said groove having a mercury outlet adapted to maintain in the groove mercury having an inner vertical wall forming an unobstructed continuation of the inner wall of the rim.

2. In a centrifugal mercury trap, a rotating receptacle having an upper part provided with an outwardly and upwardly curved inner wall terminating in a rim adapted to permit flow and discharge of tailings in a thin film, there being a groove in the rim extending outwardly from its inner wall, said groove having a mercury outlet inwardly extending from its outer edge and adapted to maintain in the groove mercury having an inner vertical wall forming an unobstructed continuation of the inner wall of the rim.

PAUL A. NEUMANN.